May 19, 1925.
N. T. ALBRIGHT
1,538,264
ILLUMINATED OIL GAUGE
Filed March 28, 1924
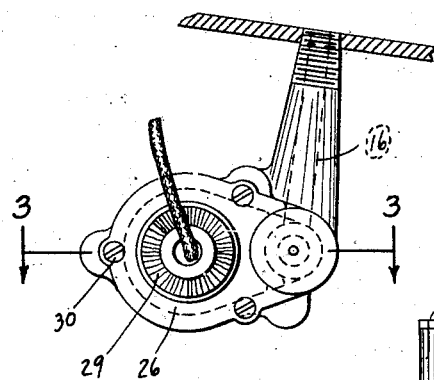
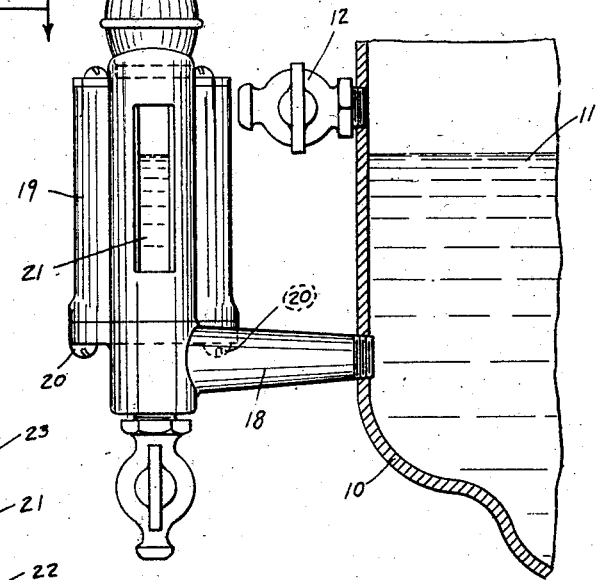
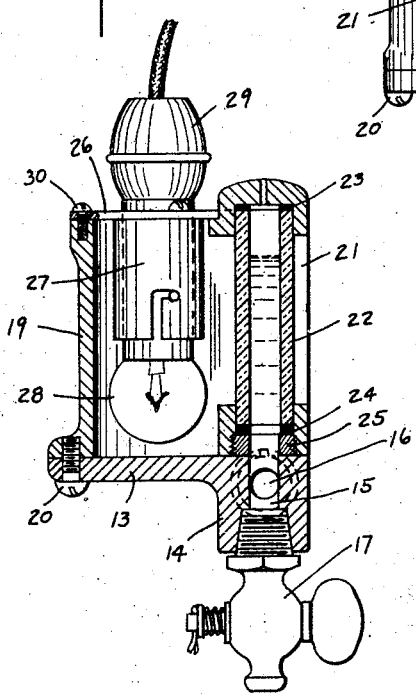
INVENTOR.
NEIL T. ALBRIGHT.
BY
ATTORNEYS.

Patented May 19, 1925.

1,538,264

UNITED STATES PATENT OFFICE.

NEIL T. ALBRIGHT, OF KOKOMO, INDIANA, ASSIGNOR TO KOKOMO AUTOMOTIVE MFG. CO., OF KOKOMO, INDIANA, A CORPORATION.

ILLUMINATED OIL GAUGE.

Application filed March 28, 1924. Serial No. 702,530.

*To all whom it may concern:*

Be it known that I, NEIL T. ALBRIGHT, a citizen of the United States, and a resident of Kokomo, county of Howard, and State of Indiana, have invented a certain new and useful Illuminated Oil Gauge; and I do hereby declare that the following is a full, clear, and exact description thereof, reference being had to the accompanying drawings, in which like numerals refer to like parts.

This invention relates to an illuminated oil gauge for vehicles or the like, and particularly adaptable for that type of motor employing pet cocks at varying levels in the crank case for enabling one to determine whether or not the oil level is above or below the pet cocks. Substituting an oil gauge for one of the pet cocks, the position thereof is such as to cause it to become dirty and dusty which, in addition to being positioned under the vehicle, prevents one from readily seeing the oil level indicated thereby. This makes it necessary to employ means in connection with the oil gauge for illuminating the same so that by simply glancing under the car during the illumination of the oil gauge, the level of oil therein may be readily observed.

It may be stated that oil gauges have heretofore been illuminated for various purposes, and, in fact, oil gauges of this character and used in the same manner as the one disclosed herein have also been employed with a lamp housing connected therewith in which a lamp is positioned for illuminating purposes.

However, it is the object of this invention to so construct an illuminated oil gauge of this character as to simplify the manufacture and assembly thereof and increase its efficiency and durability, the invention pertaining to the structural features thereof as will be hereafter more fully set forth and claimed.

The full nature of the invention will be understood from the accompanying drawings and the following description and claims:

In the drawings, Figure 1 is a plan view looking down upon the oil gauge. Fig. 2 is a front elevation thereof. Fig. 3 is a central vertical section taken on the line 3—3 of Fig. 1 with the lamp and its socket in elevation.

In the drawings there is shown a crank case 10 adapted to contain oil 11 to substantially the level indicated therein. Said crank case is provided with an upper and lower orifice into which pet cocks 12 are adapted to screw so that if oil flows from the upper pet cock, it indicates an over supply and if it does not flow from the lower pet cock, it indicates an insufficient supply.

As herein shown, the lower pet cock is removed and the oil gauge screwed into the crank case opening, as indicated in Fig. 2. The oil gauge comprises a base plate or support 13 formed integral with a downwardly extending projection 14 having a vertical bore 15 extending therethrough and a horizontal bore 16. The lower end of the projection 14 is provided with a tapered screw-threaded opening to receive the pet cock 17. Extending at right angles from the projection 14 there is a supporting arm 18 through which a port 16 passes, said arm being screw threaded on its end so as to engage the screw threaded opening of the crank case left by the removal of the lower pet cock.

Supported on the base 13 and conforming in outline thereto there is an upright casting 19 which is secured thereto by the screws 20. The casting 19 is provided with a vertical slot or opening 21 in one side thereof with an adjacent tube receiving socket for receiving and supporting therein the glass gauge tube 22. After the tube 22 is mounted in position so that the upper end thereof abuts against and is sealed by the gasket 23, the gasket 24 is inserted against the lower end of the tube, and the screwthreaded hollow plug 25 is screwed into the lower end of the casting 19 for retaining the tube therein.

By means of this arrangement, the gauge may be readily formed in two main parts and readily assembled with the tube, plug and pet cock. The oil will then seek its level in the tube through the horizontal port 16, vertical port 15 and hollow plug 25. A suitable air hole may be provided in any desirable manner at the top of the tube 22 for permitting the free movement of the oil level therein. The oil gauge will be observed through the slot 21, and will be entirely open to the chamber enclosed by the housing 19.

For illuminating the oil gauge, there is provided a top plate 26 having a depending lamp socket 27. The lamp 28 is mounted in the socket 27 and is electrically connected through a connecting plug 29. The plate is then mounted over the top of the casting 19 and secured thereto by the screws 30. This structure and assembly will permit of the ready removal and replacement of the lamp so as to obtain full illumination of the entire length of the gauge tube.

By switching on the lamp 28 and glancing under the vehicle, the oil level in the crank case may be readily observed in the gauge tube 21.

The invention claimed is:

1. An oil gauge comprising a supporting base plate, a hollow casting opened at its top and bottom adapted to be mounted on and detachably secured to said base plate, said casting being provided with sockets for receiving a glass gauge tube and with a slot formed therein to expose one side of a glass tube when mounted in said sockets, and a lamp supporting plate mounted on and detachably secured to the upper edge of said casting for closing its upper opening and forming an enclosed illuminating chamber for said gauge tube.

2. An oil gauge comprising a hollow casting opened at its top and bottom having receiving sockets in each end thereof and a vertical slot opening in the lateral walls thereof, a gauge glass seated in said sockets and adapted to be viewed through said opening, a plate removably connected to one end of said casting, and a lamp supporting plate removably connected at the other end thereof, whereby said casting will be enclosed at each end to provide an illuminated compartment for said gauge tube.

3. An oil gauge comprising a supporting base plate, a tubular arm connected therewith and extending laterally therefrom, said plate having a vertical port extending through one portion thereof and communicating with the opening in said arm, a pet cock adapted to be screwed into the lower end of said port, an upright casting removably secured on said plate, said casting being provided with a longitudinal slot at one side thereof and oppositely positioned sockets in alignment with said port, a tubular gauge member mounted in said sockets, a hollow plug removably secured in the lower end of one of said sockets for holding said gauge member in position therein, said casting having an opening at its upper end at one side of the socket, a removable plate secured on the top of said casting closing said opening, and a lamp socket suspended from said plate within said casting for receiving an illuminating lamp adapted to illuminate the interior thereof and said gauge tube, substantially as and for the purpose described.

In witness whereof, I have hereunto affixed my signature.

NEIL T. ALBRIGHT.